（12）United States Patent
Knebl et al.

(10) Patent No.: US 8,931,521 B2
(45) Date of Patent: Jan. 13, 2015

(54) BENT THERMOPLASTIC PIPE

(75) Inventors: Juergen Knebl, Neustadt (DE); Peter Luettmann, Waghaeusel (DE); Michael Groel, Speyer (DE)

(73) Assignee: PFW Aerospace AG, Speyer (DE)

( * ) Notice: Subject to any disclaimer, the term of this patent is extended or adjusted under 35 U.S.C. 154(b) by 145 days.

(21) Appl. No.: 13/493,356

(22) Filed: Jun. 11, 2012

(65) Prior Publication Data

US 2012/0325363 A1 Dec. 27, 2012

Related U.S. Application Data

(60) Provisional application No. 61/495,954, filed on Jun. 10, 2011.

(51) Int. Cl.
*F16L 9/00* (2006.01)
*B29C 53/08* (2006.01)
*B29C 53/84* (2006.01)

(52) U.S. Cl.
CPC ............... *B29C 53/083* (2013.01); *B29C 53/84* (2013.01); *Y10S 138/11* (2013.01)
USPC .................................... 138/177; 138/DIG. 11

(58) Field of Classification Search
USPC ............ 138/177, 178, DIG. 11; 264/339, 479
See application file for complete search history.

(56) References Cited

U.S. PATENT DOCUMENTS

| 4,662,404 | A  | * | 5/1987 | LeVeen et al. | 138/120 |
|---|---|---|---|---|---|
| 6,098,668 | A  | * | 8/2000 | Siwinski et al. | 138/177 |
| 6,331,072 | B1 | * | 12/2001 | Schierholz et al. | 366/338 |
| 7,810,524 | B2 | * | 10/2010 | Sakazaki | 138/141 |
| 8,127,799 | B2 | * | 3/2012 | Cortez | 138/97 |
| 8,475,762 | B2 | * | 7/2013 | Li et al. | 423/555 |
| 2004/0154732 | A1 | * | 8/2004 | Mason et al. | 156/221 |
| 2010/0247044 | A1 | * | 9/2010 | Noddings et al. | 385/99 |
| 2011/0270262 | A1 | * | 11/2011 | Justis et al. | 606/101 |
| 2013/0327437 | A1 | * | 12/2013 | Feng et al. | 138/177 |

FOREIGN PATENT DOCUMENTS

GB 2 390 566 A 1/2004

* cited by examiner

*Primary Examiner* — Patrick F Brinson

(57) ABSTRACT

A method for producing a bent pipe from thermoplastic material with end cross-sections, central points of which have in relation to one another a positional tolerance on the basis of LN xy/JAR xy/FAR xy in relation to one another. A straight pipe element is introduced into a tool and a portion of the straight pipe element is heated that is located in the bending region to a temperature which lies above a glass transition temperature of the thermoplastic material by a first temperature value. The straight pipe element is bent about the heated bending region of the tool by a freely selectable bending angle, which has a spatial alignment in an XYZ system of coordinates that is fixed with respect to the pipe. The pipe is then cooled below the glass transition temperature by a second temperature value.

6 Claims, 3 Drawing Sheets

BENT THERMOPLASTIC PIPE

This nonprovisional application claims priority to U.S. Provisional Application No. 61/495,954, which was filed on Jun. 10, 2011, and is herein incorporated by reference.

BACKGROUND OF THE INVENTION

1. Field of the Invention

The invention relates to a method for producing a bent pipe from thermoplastic material.

2. Description of the Background Art

The bending of straight lengths of pipe into bent pipes by means of press bending, roll bending or 3-roller bending is known in mechanical engineering. In the production of bent pipes for pipe networks, the prime objective is to achieve high production precision. High production precision takes the form of maintaining narrow positional tolerances of end regions of pipes that can be installed at their intended location without additional bending stress. In particular in the case of pipe networks, in which stress-free installation must be ensured for technical reasons, production with high accuracy is absolutely necessary. Production precision in the case of bent pipes also takes the form of maintaining the roundness of the bent pipe. Deviations from the circular cross-section of a pipe, known as ovality, in the end cross-section make it more difficult to make a connection to another pipe to which the bent pipe is intended to be connected. Furthermore, ovality between end cross-sections of a pipe in which fluid is carried under varying pressure has the effect that the region with the oval cross-section has a short lifetime. Furthermore, many technical areas in which bent pipes are used strive for weight-saving constructions, and aim to use plastic pipes instead of metal pipes.

GB 2 390 566 A discloses a method for bending a thermoplastic pipe in which a thermoplastic pipe is bent in a heated state around a bending body. An infrared emitter is used there for heating the thermoplastic pipe. Furthermore, in a final step, the heated bent pipe is cooled. A disadvantage of this method is the high thermal distortion and the limited production precision.

SUMMARY OF THE INVENTION

The method according to the invention overcomes the disadvantages of the methods known from the prior art. The method according to the invention provides a possibility for producing a bent pipe of thermoplastic material. The pipe produced by the method according to the invention has end sections each with a central point having in relation to one another a positional tolerance of a maximum of +/−1 mm. The method according to the invention comprises the following steps:

A straight pipe element is introduced into a tool which has a bending region that is heated. Furthermore, a portion of the straight pipe element that is located in the bending region of the tool is heated by the bending region being heated. The heated portion of the straight pipe element is thereby heated to a temperature which exceeds the glass transition temperature of the thermoplastic material by a first temperature value. This establishes a temperature distribution in a portion of the straight pipe element. In this case, the highest temperatures occur in the regions that assume a minimal distance from the heated bending region of the tool. Furthermore, low temperatures occur in regions of the straight pipe element on a part of the circumference that is remote from the bending region. In a further step, the straight pipe element is bent into a bent pipe element which has a bending radius that is ensured by the form of the bending region of the tool. The bending of the straight pipe element into a bent pipe element takes place by a freely selectable bending angle, which has a spatial alignment in an xyz system of coordinates that is fixed with respect to the pipe.

In a further step, the bent pipe element is cooled to a temperature which lies below the glass transition temperature of the thermoplastic material by a second temperature value. During the cooling, all regions of the bent pipe element reach a temperature below the glass transition temperature, while retaining the temperature distribution from the step that comprises the heating at a reduced temperature level and in a less distinct form. Furthermore, the preceding steps may be repeated at at least one different location of the bent pipe, the respective spatial alignments of the bending angles being freely selectable.

The method according to the invention may be designed such that the first temperature value lies in a range from 5° to 100° C. Furthermore, the method may be designed such that the second temperature value lies in a range from 5° to 100° C. The heated bending region of the tool may be provided with an electrically heated flank, channels with temperature-controlled liquid that run through the tool, an infrared emitter, an induction device or a hot-air blower. Furthermore, the method according to the invention may be designed such that the first and second temperature values are set such that the bent pipe undergoes a tolerable temperature transition with minimal distortion in the method according to the invention. A tolerable temperature transition with minimal distortion ensures that the central points of the end cross-sections of the bent pipe in an end state have a positional tolerance in relation to one another of a maximum of +/−1 mm and the bending angle has a narrow tolerance, preferably of 0.5°. Furthermore, the step of the method according to the invention in which the straight pipe element is bent into a bent pipe element may be designed such that the bending angle lies in a tolerance range below 0.5°.

The step of the method according to the invention in which the bent pipe element is cooled to a temperature which lies below the glass transition temperature of the thermoplastic material by a second temperature value may perform the cooling for example by means of cold air, liquefied gas or water. In the method according to the invention, the first and second temperature values, the bending angle and the bending radius may be coordinated with one another, so that a deformation of the cross-section of the pipe in the direction of an ovality is prevented. If the first and second temperature values and the bending radius are coordinated with one another, the roundness of the pipe is maintained in the method according to the invention. At the same time, a tolerable temperature transition ensures that the ovality is small, preferably less than 7%, more preferably less than 5%, particularly preferably less than 3%.

In addition, the invention may have at least one measuring device, by means of which the temperature of a region of the surface of the pipe element is measured. The result of the measuring device is passed on to a control unit, which intervenes in the control of the heating and cooling device by means of a feedback control. The control unit ensures a processing temperature in the measured region of the surface of the pipe element that exceeds or lies below the glass transition temperature of the thermoplastic material by the first or second temperature value, depending on the method step.

Furthermore, the method according to the invention may be designed such that the surface quality of an inner side and an outer side of the bent pipe is not impaired by the bending method. The method according to the invention is substantially characterized by the parameters of the first and second temperature values, the bending radius and the bending angle. Maintaining the surface quality of the inner side thus minimizes the frictional pipe resistance of the bent pipe. Furthermore, maintaining the surface quality of the outer side of the bent pipe makes it easier for the pipe to be installed in a situation with insulating material. In this case, the surface qualities of the inner side and outer side remain substantially the same.

Furthermore, polyether ether ketone, polyether sulphone, polyether ketone, polyphenylene sulphide or polyethyleneimine may be used in the method according to the invention as thermoplastic materials.

In the step of the method according to the invention in which the straight pipe element is bent into a bent pipe element, the bending region may be supported from the inside by an auxiliary component, preferably a mandrel, by gas pressure or a heat-resistant scratchproof filling material. Heat-resistant scratchproof filling materials are, in particular, glass or steel beads.

Furthermore, the invention relates to a bent pipe which is produced from thermoplastic material and has at least one bent region. The bent region is characterized by a bending radius and a bending angle. Furthermore, the bent pipe of thermoplastic material has end cross-sections each with a central point at a distance from one another in all three coordinate axes in an xyz system of coordinates that is fixed with respect to the bent pipe. The distances of the central points of the end cross-sections in this case lie in the range of a positional tolerance of a maximum of +/−1 mm. Equally, the bending angle has a tolerance of below 0.5°. Maintaining the tolerance of the bending angle and the positional tolerance of the central points of the end cross-sections ensures load-free installation of the bent pipe.

Furthermore, the bent pipe according to the invention may be designed such that in the bent region it has a cross-section with little deviation of the roundness of the pipe, and when the pipe is subjected to internal pressure ensures a uniform stress distribution in the cross-section of the bent region. In this case, the pipe cross-section has an ovality of less than 7%, preferably less than 5%, particularly preferably less than 3%. Furthermore, the pipe according to the invention may be designed such that the pipe has over the entire circumference in the bent portion a wall thickness which deviates less than 10% from the wall thickness of the straight portion.

The bent pipe according to the invention may be designed such that a bent portion of the bent pipe has a surface quality that is the same as a straight portion of the bent pipe.

The method according to the invention may be carried out on a conventional bending device, which requires only a small amount of modification. This substantially means that a heated bending region is formed in the conventional bending device. Furthermore, a conventional bending device has NC-controlled tools, which carry out the method step comprising the bending of a straight pipe element. Carrying out the method according to the invention on a bending device with NC-controlled tools ensures reproducible method results.

Furthermore, the invention relates to the use of the bent pipe in an aircraft.

The method according to the invention provides a possibility of producing reliably and inexpensively bent pipes of thermoplastic material that meet high precision requirements, as are demanded for example in aircraft registration regulations. In numerous technical areas, the use of pipes of thermoplastic material is preferred over metal pipes on account of the weight advantage. Maintaining close production tolerances allows end cross-sections of a pipe and central points thereof to be brought into an exactly defined relative position in relation to one another. This provides the possibility of carrying out stress-free installation. A pipe which is installed stress-free is not under any pre-loading and, as a result, is less sensitive to operationally dependent load changes. Furthermore, loads which act on a structure of the installation space are avoided. For numerous applications, such as for example aircraft construction, this requirement is indispensable, so that the method according to the invention provides weight-saving pipes of thermoplastic material for numerous technical areas that have high precision requirements.

According to the method according to the invention, in a first step, a straight pipe element is heated beyond the glass transition temperature of the thermoplastic material by a value from a range from 5 to 100° C. After exceeding the glass transition temperature, the thermoplastic material has good deformability. Even when the glass transition temperature is exceeded by a small temperature value, there is deformability of the thermoplastic material, which increases with further increasing of the temperature. Furthermore, the deformability of the thermoplastic material is no longer obtained at a temperature below the glass transition temperature. To save energy, it is therefore possible to dispense with cooling any further. Furthermore, continuous measurement and feedback control of the temperature at the surface of the pipe element ensures good deformability thereof in the entire portion to be bent of the pipe element. The measuring of the temperature of the surface may be carried out here by means of thermocouples. In addition, a selection of temperature values that lie between 50 and 100° C. above or below the glass transition temperature of the thermoplastic material represents a tolerable temperature transition of the pipe in the method. A tolerable temperature transition ensures a minimization of the thermal distortion of the pipe in the method according to the invention. A minimal thermal distortion reduces the deviation from the desired deformation and increases the production precision. Positional tolerances of the central points of the end cross-sections of a maximum of +/−1 mm and tolerances of the bending angle of below 0.5° are made possible as a result.

Furthermore, such a temperature transition of the thermoplastic material in the method according to the invention reduces the need for heating and cooling power and increases the possible speed of the process.

Furthermore, the method according to the invention ensures that pipes produced by means of the method have a minimal ovality. A minimal ovality, and consequently a high degree of roundness, ensures that, when there is varying loading from internal pressure, a state of stress that is uniform over the circumference of the pipe is established in the pipe cross-section. A uniform state of stress is free from stress peaks, which cause high degrees of loading on the material at the locations at which they occur, and thus reduce the lifetime of the pipe. An ovality of less than 3% in this case ensures a lifetime of bent portions that are substantially identical to the lifetime of straight portions.

In principle, the ovality is all the less the greater the bending radius 18. Ovalized cross-sections also have a smaller cross-sectional area than the circular cross-sections from which they are produced. As a result, a fluid flow is accelerated in an ovalized region. An increased speed of a liquid flow in a pipe causes additional flow resistance, and consequently additional pressure loss. The method according to the invention minimizes these disadvantageous effects.

Furthermore, when the glass transition temperature is exceeded in a thermoplastic material, a transition takes place from a brittle energy-elastic behavior to a soft entropy-elastic behavior of the thermoplastic material. Thermoplastic materials which exhibit entropy-elastic behavior have a high degree of formability and present virtually no forces of resilience to external mechanical effects. Formability without significant forces of resilience allows the thermoplastic material to be deformed with precision with little expenditure of force. The method according to the invention ensures precise formability with respect to bending radii and bending angles. Precise bending radii and bending angles consequently allow the central points of the end cross-sections of a pipe processed with the aid of the method according to the invention to be brought into a relative position in relation to one another that lies within narrow positional tolerances.

The method according to the invention is not restricted to applying to a pipe only bends that lie in a common plane. Furthermore, a geometrical variability of the bent pipes to be produced is ensured by the method according to the invention. If, after a prior implementation of the method according to the invention, the pipe to be processed is turned by any desired defined angle about the longitudinal axis of the pipe, it is possible in a further implementation of the method according to the invention to provide the pipe to be processed with a further bending. Further bending of the pipe to be processed may lie here in a different plane than the prior bending. Pipe longitudinal axes of straight portions of pipe extend here in any desired spatial directions.

In addition, the method according to the invention provides a possibility of producing bent thermoplastic pipes in which extension and compression effects only occur to a small degree in the bent regions. In this case, the wall thickness of a bent thermoplastic pipe remains virtually constant in the bent regions. A constant wall thickness ensures a uniform stress distribution when the pipe is subjected to internal pressure. The wall thickness in a bent portion of the pipe deviates from a straight portion by at most 10%. As a result, the occurrence of stress peaks is avoided and the lifetime of the bent region of the bent thermoplastic pipe is increased.

Furthermore, the method according to the invention can be carried out easily and on conventional bending devices with simple modifications. As a result, the method according to the invention increases the number of possibilities for producing bent thermoplastic pipes and can be easily put into practice.

Furthermore, conventional bending devices today have NC-controlled tools which can carry out the method according to the invention. The NC-controlled tools allow process parameters, such as for example the bending angle and bending rate, to be set. Furthermore, the use of NC-controlled tools ensures that the method according to the invention can be carried out automatically and produces reproducible results. The method according to the invention improves the process efficiency when bending thermoplastic pipes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
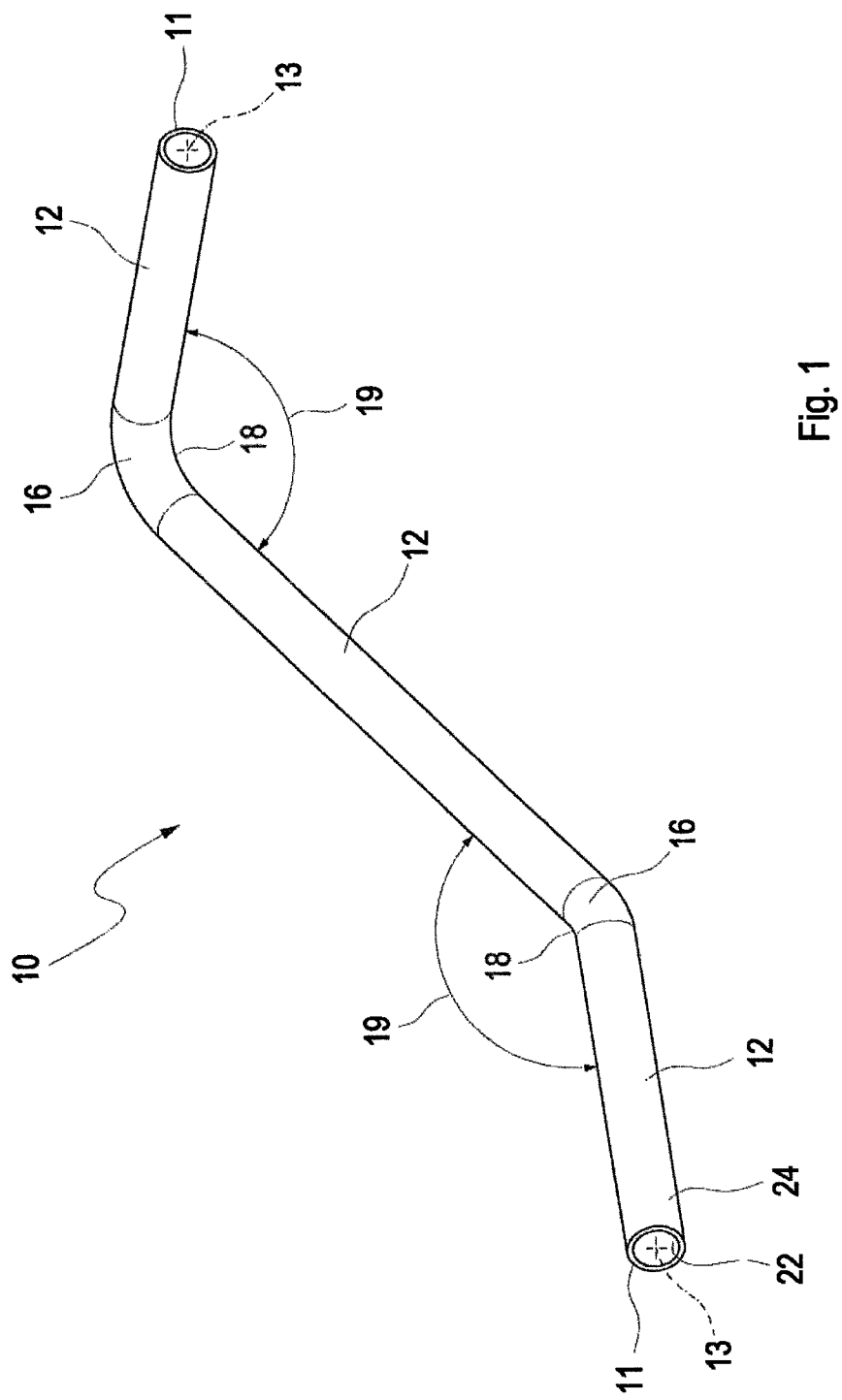
FIG. 1 shows a pipe bent according to the method according to an embodiment of the invention.

FIG. 1 shows a schematic representation of a pipe 10, which has been produced by the method according to the invention. The bent pipe 10 has end cross-sections 11, which each have a central point 13. The end cross-sections 11 have a circular cross-section. The pipe 10 has straight portions 12 and bent portions 16. A bent portion 16 is characterized by a bending radius 18 and a bending angle 19. The pipe 10 also has an inner side 22 and an outer side 24. Furthermore, the longitudinal axes of the straight portions 12 lie in spatially different planes. Furthermore, the straight portions 12 that end in the end cross-sections 13 are designed such that the longitudinal axes of the straight portions 12 are in line with longitudinal axes of further pipes, not depicted, with which the bent pipe 10 is to be connected.

Figure 2:
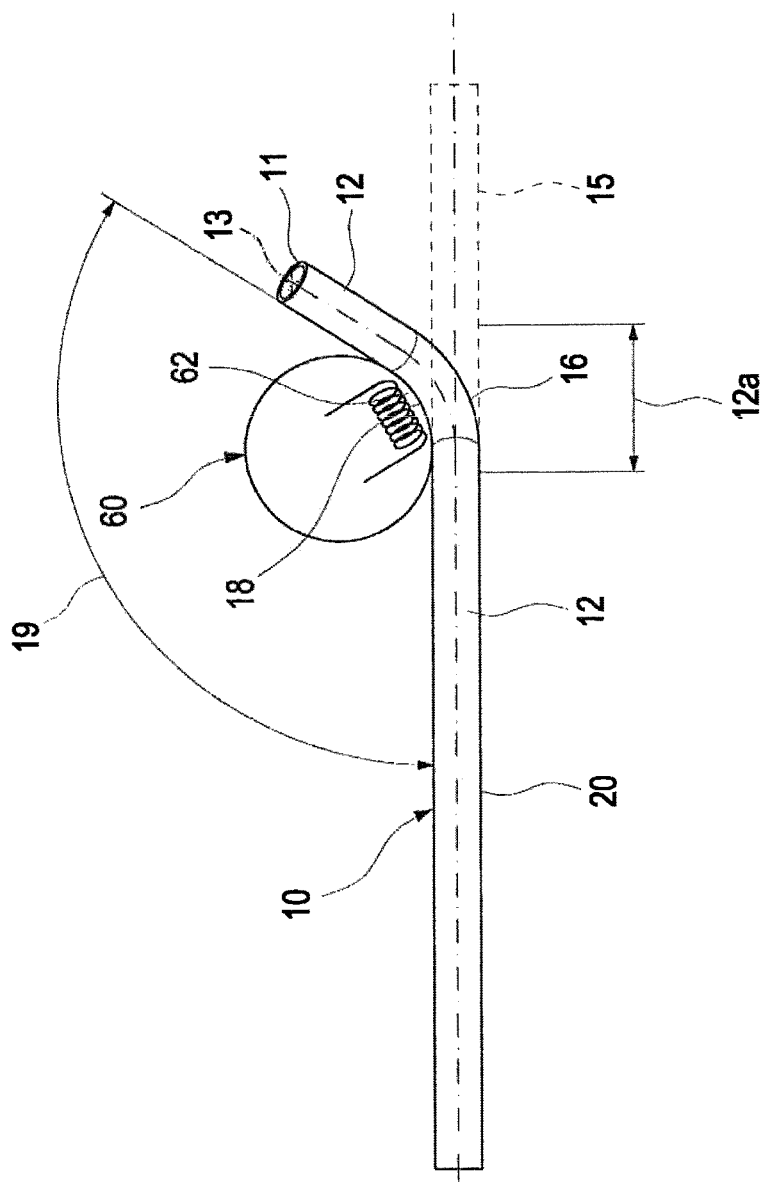
FIG. 2 shows a pipe element before and after the method according to an embodiment of the invention.

FIG. 2 schematically shows the method according to the invention for bending a thermoplastic pipe. For this purpose, in a first step, the straight pipe element 15 is introduced into the tool 60, which has a heatable bending region 62. In a following step that is not represented, the portion 12a of the straight pipe element 15 that is adjacent to the bending region 62 is heated by heating the bending region 62. In a further step that is not represented, the glass transition temperature of the thermoplastic material from which the straight pipe element 15 is produced is exceeded by 5 to 100° C. The exceeding of the glass transition temperature of the thermoplastic material brings about a transition from brittle energy-elastic behavior to soft entropy-elastic behavior. A formability of the thermoplastic material which ensures that the following step can be carried out is thereby achieved. In a further step, the straight pipe element 15 adjacent to the bending region 62 is bent by the bending radius 18, which is defined by the form of the tool 60. The heated portion 12a thereby undergoes forming into the bent portion 16. Furthermore, the bending about the bending region 62 of the tool 60 takes place by a bending angle 19, which can be freely chosen. The bending angle 19 also defines the position of the straight portions 12 in relation to one another. The straight pipe element 15 thereby becomes the bent pipe element 20. In this case, the straight pipe element 15 to be bent is supported from the inside by an auxiliary component that is not represented. In a further step, the bent pipe element 20 is cooled in the bending region 18. The cooling has the effect that a temperature which lies 5 to 100° C. below the glass transition temperature of the thermoplastic material is reached in the bent region 16. A transition of the thermoplastic material from soft entropy-elastic behavior to brittle energy-elastic behavior thereby takes place.

Figure 3:
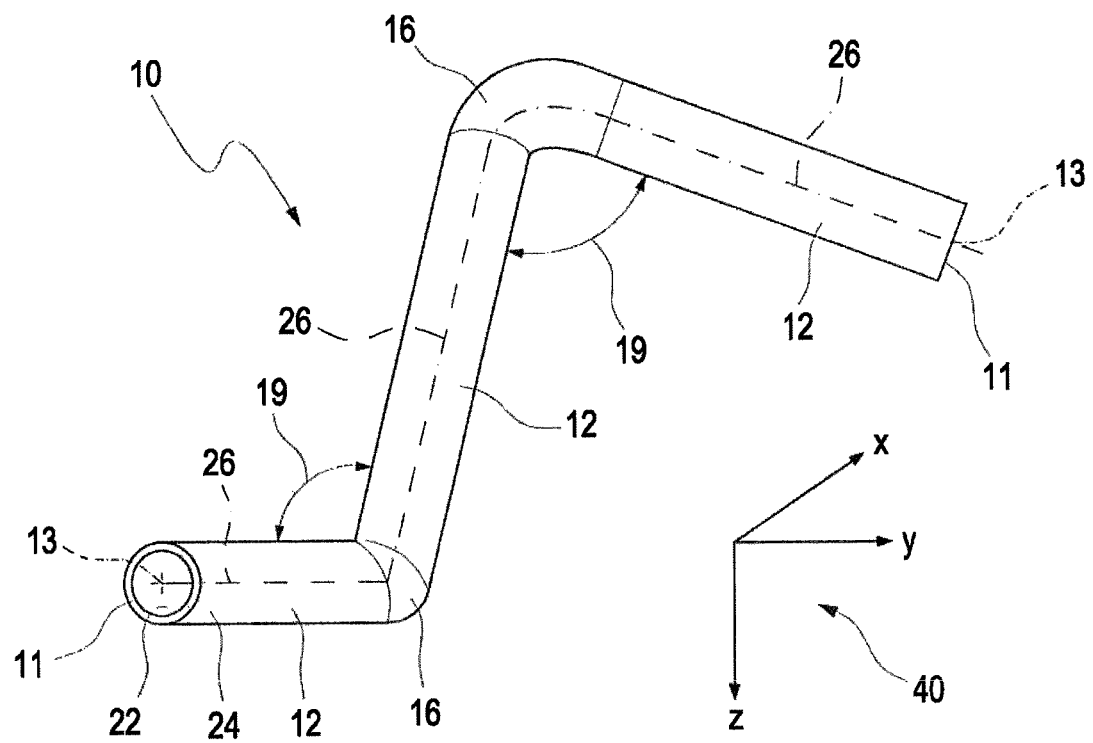
FIG. 3 shows a pipe bent according to the method according to the invention with three-dimensional alignment of the portions.

FIG. 3 schematically shows a bent pipe 10, in which the bending angles 19 have different spatial alignments. The central points 13 of the end cross-sections 11 are relatively at a distance from one another along the x, y and z axes of a system of coordinates 40. The bent pipe 10 has in each straight portion 12 a longitudinal axis 26. The longitudinal axes 26 have a spatial alignment in relation to one another. Furthermore, the longitudinal axes 26 of the straight portions 12 that end in end cross-sections 11 are in line with longitudinal axes of pipes not represented to which the bent pipe 10 is to be connected.

Figure 4:
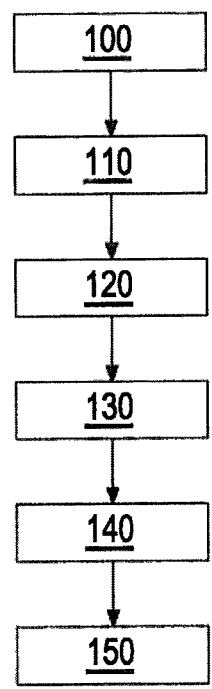
FIG. 4 shows a flow diagram of the method according to the invention

FIG. 4 shows the method according to the invention in a flow diagram. The initial state 100 here is the straight pipe element 15. In a first step 110, this is introduced into the tool 60. The heatable bending region 62 formed in the tool 60 lies here adjacent to the region 12a of the straight pipe element 15 that is to be bent.

Furthermore, in step 110, the region 12a of the straight pipe element 15 is heated by the heatable bending region 62. After the first step 110, the heating is carried out up to a specific temperature. The first step 110 goes over here into the second step 120, in which the region 12a of the straight pipe element 15 exceeds the glass transition temperature of the thermoplastic material from which it is produced by a first temperature value. The first temperature value lies here between 5 and 100° C. Furthermore, in the second step 120, a transition from a brittle energy-elastic behavior to a soft entropy-elastic behavior takes place in the thermoplastic material. The transition to soft entropy-elastic behavior ensures a formability of the straight pipe element 15 that is required for the then following third step 130.

In the case of the third step 130, the straight pipe element 15 is bent about the bending region 62 of the tool 60. The region 12a, the temperature of which lies 5 to 100° C. above the glass transition temperature, is formed thereby into the bending region 16. The bending region 16 is characterized by the bending radius 18 and the bending angle 19. In this case, the bending radius 18 is dependent on the contour of the tool 60. The bending angle 19 can be freely chosen. The bending angle 19 establishes in which relative position the central points 13 of the end cross-sections 11 of the straight portions 12 are in relation to one another. The bent region 16 lies here between the straight pipe portions 12. Furthermore, the bending angle 19 may be set exactly in such a way that the positional tolerance of the central points 13 of the end cross-sections 11 meets the requirements of aircraft registration regulations. In addition, the bending angle 19 can be set exactly in such a way that the pipe longitudinal axis 26 of a straight pipe portion 12 that opens out in an end cross-section 11 is in line with a pipe longitudinal axis of another pipe to which the bent pipe element 20 is to be connected.

Furthermore, the parameters of the first temperature value, the bending radius 18 and the bending angle 19 are coordinated with one another in order to avoid an ovalization of a circular cross-section of the straight pipe element 15 in the region 12a.

In a further step 140, the bent pipe element 20 is cooled in the bent portion 16. In the case of step 140, the temperature is 5 to 100° C. below the glass transition temperature of the thermoplastic material from which the bent pipe element 20 is produced. A transition from soft entropy-elastic behavior to brittle energy-elastic behavior thereby takes place in the thermoplastic material. The formability of the bent pipe element 20 then subsides to the greatest extent. After the fourth step 140, the bent pipe element 20 remains substantially free of distortion. The bent pipe element 15 in the end state 150 thereby meets the requirements with respect to positional tolerance of the central points 13 of the end cross-sections 11 of a positional tolerance of +/−1 mm. Equally, the bent element 15 meets the requirement of a tolerance of the bending angle of 0.5° and has an ovality of less than 3%. The wall thickness of the pipe element 15 in the bent portions 16 deviates from the wall thickness in a straight portion 12 by at most 10%.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A bent pipe comprising:
   straight portions; and
   at least two bent portions,
   wherein pairs of the straight portions span different planes,
   wherein each bent portion has a bending radius and a bending angle,
   wherein two straight portions each have an end cross-section with a central point, and
   wherein the central points of end cross-sections have a positional tolerance in relation to one another of a maximum of +/−1 mm,
   wherein each bent portion has an ovality of less than 7% and a wall thickness which deviates from the straight portion by less than 10%,
   said bent pipe made of thermoplastic material, and
   the bent pipe material bringing about a transition from brittle energy-elastic behavior to soft entropy elastic behavior subject to heating above glass transition temperature and bringing about a transition from soft entropy elastic behavior to brittle energy-elastic behavior when cooled below glass transition temperature.

2. The bent pipe according to claim 1, wherein the bending angles have a tolerance of below 0.5°.

3. The bent pipe according to claim 1, wherein the bent pipe has in the bent region a cross-section with little deviation of the roundness, and substantially the same mechanical load-bearing capacity and lifetime as straight portions of the bent pipe.

4. The bent pipe according to claim 1, wherein the pipe element has on an inner side and an outer side, a surface quality that is substantially the same.

5. The bent pipe according to claim 1, wherein the bent pipe is a pipe for an aircraft.

6. The bent pipe according to claim 1, wherein the thermoplastic material is selected from the group consisting of polyether ether ketone, polyether sulphone, polyether ketone, polyphenylene sulphide, polyethyleneimine, and mixtures thereof.

* * * * *